(12) United States Patent
Kozono et al.

(10) Patent No.: US 12,522,071 B2
(45) Date of Patent: Jan. 13, 2026

(54) DISPLAY CONTROL DEVICE FOR VEHICLE, DISPLAY METHOD FOR VEHICLE, AND STORAGE MEDIUM

(71) Applicant: TOYOTA JIDOSHA KABUSHIKI KAISHA, Toyota (JP)

(72) Inventors: Yuki Kozono, Okazaki (JP); Shu Nakajima, Toyota (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/773,772

(22) Filed: Jul. 16, 2024

(65) Prior Publication Data

US 2024/0367516 A1    Nov. 7, 2024

Related U.S. Application Data

(63) Continuation of application No. 18/225,804, filed on Jul. 25, 2023, now Pat. No. 12,227,072.

(30) Foreign Application Priority Data

Aug. 22, 2022    (JP) ................................. 2022-132099

(51) Int. Cl.
*G06F 3/02* (2006.01)
*B60K 35/23* (2024.01)
(Continued)

(52) U.S. Cl.
CPC .............. *B60K 35/28* (2024.01); *B60K 35/23* (2024.01); *G06F 3/02* (2013.01); *G06F 3/04817* (2013.01);
(Continued)

(58) Field of Classification Search
CPC ....... G06F 3/02; G06F 3/04817; B60K 35/00; B60K 35/23; B60K 35/10; B60K 35/60; B60K 2360/128; B60K 2360/782
See application file for complete search history.

(56) References Cited

U.S. PATENT DOCUMENTS

2014/0165005 A1    6/2014  Takikawa et al.
2018/0059912 A1*   3/2018  Takikawa ............... B60K 35/10
(Continued)

FOREIGN PATENT DOCUMENTS

JP    2014-115578 A    6/2014
JP    2018-070040 A    5/2018
JP    2021-075157 A    5/2021

OTHER PUBLICATIONS

Oct. 23, 2024 Notice of Allowance issued in U.S. Appl. No. 18/225,804.
Apr. 24, 2024 Office Action issued in U.S. Appl. No. 18/225,804.

*Primary Examiner* — Lisa S Landis
(74) *Attorney, Agent, or Firm* — Oliff PLC

(57) ABSTRACT

A display control device for a vehicle includes a memory; and a processor connected to the memory and is configured to: detect an operation of a steering switch; on the basis of the detected operation, display plural icons corresponding to the steering switch at a display section in a cabin, the plural icons including a first icon representing a first function that is implemented by a short press operation of the steering switch, and a second icon representing a second function that is implemented by a long press operation of the steering switch; and in a case in which the short press operation is detected, display the first icon such that a disposition of the first icon in the display section corresponds to a disposition of the steering switch at a steering wheel, and display the second icon at a different position in the display section from the first icon.

14 Claims, 10 Drawing Sheets

(51) Int. Cl.
    *B60K 35/28*     (2024.01)
    *G06F 3/04817*   (2022.01)
    *B60K 35/10*     (2024.01)
    *B60K 35/60*     (2024.01)

(52) U.S. Cl.
    CPC .............. *B60K 35/10* (2024.01); *B60K 35/60* (2024.01); *B60K 2360/128* (2024.01); *B60K 2360/782* (2024.01)

(56) References Cited

U.S. PATENT DOCUMENTS

| | | |
|---|---|---|
| 2018/0118208 A1 | 5/2018 | Inoguchi et al. |
| 2021/0138903 A1* | 5/2021 | Kozono ................ B60K 35/28 |

\* cited by examiner

DISPLAY CONTROL DEVICE FOR VEHICLE, DISPLAY METHOD FOR VEHICLE, AND STORAGE MEDIUM

CROSS-REFERENCE TO RELATED APPLICATIONS

This is a Continuation of U.S. patent application Ser. No. 18/225,804 filed Jul. 25, 2023 (now U.S. Pat. No. 12,227,072), which is based on and claims priority under 35 USC 119 from Japanese Patent Application No. 2022-132099 filed on Aug. 22, 2022. The disclosure of each of the prior applications is incorporated by reference herein in its entirety.

BACKGROUND

Technical Field

The present disclosure relates to a display control device for a vehicle, a display method for a vehicle, and a non-transitory storage medium storing a display program for a vehicle.

Related Art

Japanese Patent Application Laid-Open (JP-A) No. 2021-075157 discloses an input device for a vehicle in which plural switches are disposed at a steering wheel or the like. When this input device for a vehicle detects operation of one of the plural switches, information relating to on-board equipment that is assigned to that switch is displayed at a display section, which is provided to the vehicle front side of a driver seat.

Plural functions may be assigned to one switch among steering switches and the like, in which case a function that is the target of an input operation differs between, for example, a "short press operation" and a "long press operation" on an operation surface of the switch.

Because information relating to on-board equipment that is assigned to a switch, as in a display control device recited in JP-A No. 2021-075157, is displayed at a display section in a vehicle cabin, a vehicle occupant may easily operate arbitrary switches in a state in which a line of sight of the vehicle occupant is directed at the display section. However, no consideration is given to the matter of comprehensibly delivering to the vehicle occupant what function is implemented by a short press operation and what function is implemented by a long press operation.

SUMMARY

In consideration of the circumstances described above, the present disclosure provides a display control device for a vehicle, a display method for a vehicle and a non-transitory storage medium storing a display program for a vehicle that may comprehensibly deliver a function that is assigned to a short press operation of a steering switch and a function that is assigned to a long press operation.

A first aspect of the present disclosure is a display control device for a vehicle that includes: an operation detection section that detects an operation of a steering switch; and a display control section that, on the basis of an operation detected by the operation detection section, displays plural icons corresponding to the steering switch at a display section in a cabin, the plural icons including a first icon representing a first function that is implemented by a short press operation of the steering switch, and a second icon representing a second function that is implemented by a long press operation of the steering switch. When the short press operation is detected by the operation detection section, the display control section displays the first icon such that a disposition of the first icon in the display section corresponds with a disposition of the steering switch at a steering wheel, and displays the second icon at a different position in the display section from the first icon.

In the first aspect, plural icons corresponding to a steering switch group are displayed at the display section, which is provided to a front side of the steering wheel. Therefore, a vehicle occupant may operate an arbitrary switch in a state in which eyes of the vehicle occupant are directed at the display section.

In this aspect, the first icon representing the first function that is implemented by a short press operation of the steering switch and the second icon representing the second function that is implemented by a long press operation of the steering switch are displayed at the display section in the cabin.

In a case in which the short press operation is detected, the display control device for a vehicle displays the first icon such that the disposition of the first icon in the display section corresponds with the disposition of the steering switch on the steering wheel. Therefore, a vehicle occupant may intuitively understand the disposition of the switch relating to the function being implemented while keeping their eyes directed at the display section. Meanwhile, because the second icon is displayed at a different position in the display section from the first icon, the vehicle occupant may perceive that the second function can be implemented by a long press operation of the steering switch while intuitively recognizing that the second function is a different function from the function that is being implemented. Thus, the function assigned to the short press operation of the steering switch and the function assigned to the long press operation may be comprehensibly delivered to the vehicle occupant.

The meanings of the terms "short press operation" and "long press operation" as used herein may conceptually include, for example, pushing an operation surface of a switch and touching an operation section, or the like.

In the first aspect, the first icon may be displayed superposed on a graphic icon that depicts an outline of the steering switch, and the second icon may be displayed at a position that is not superposed on the graphic icon.

In the structure described above, in a case in which the short press operation of the steering switch is performed, the first icon representing the first function being implemented is displayed superposed on the graphic icon depicting the outline of the steering switch. Meanwhile, the second icon representing the second function that is not being implemented is displayed at a position that is not superposed with the graphic icon. Therefore, design of the steering switch may be associated with the graphic icon displayed at the display section and, for the first function that is being implemented, a visual effect similar to a case in which the steering switch is viewed directly may be provided while the vehicle occupant is looking at the display section. Further, for the second function that is not being implemented, because the corresponding second icon is displayed at a position that is not superposed with the graphic icon, the vehicle occupant can easily visually recognize that this function is not currently being performed.

The structure recited in the first aspect may include: a state detection section that detects a state of the vehicle relating to running; and an implementable function specification section that, on the basis of a state of the vehicle detected by the state detection section, specifies the second function that is able to be implemented by the long press operation of the steering switch. The display control section may display the second icon representing the second function specified by the implementable function specification section at the display section.

In the structure described above, in a case in which a state of the vehicle relating to traveling is detected, the second function that is able to be implemented by the long press operation of the steering switch is specified on the basis of the detected state of the vehicle. Hence, in a case in which the short press operation of the steering switch is detected, the second icon representing the second function that is able to be implemented is displayed separately from the first icon representing the first function that is being implemented. Therefore, for the second function assigned to the long press operation, only the function that is able to be implemented in accordance with the state of the vehicle relating to traveling is displayed at the display section. Thus, a quantity of information in the display section may be optimized and the second function may be comprehensibly delivered.

In the first aspect: the display section may be a projection surface of a head-up display provided to the vehicle front side of the steering wheel; a plural number of the steering switch may be provided at the steering wheel, the first function of one of the plural steering switches being a setting function of a display item in an instrument cluster display that is provided to the vehicle lower side of the projection screen, and the second function of the one of the plural steering switches being a position adjustment function of the display item that has been set by implementation of the first function; and when the long press operation is detected by the operation detection section, the display control section may display a third icon representing operation of the position adjustment function being implemented at a position in the projection surface corresponding with the steering switch and a position in the instrument cluster display corresponding with the display item.

In the structure described above, the display section is configured by a projection screen of a head-up display provided to the vehicle front side of the steering wheel. Therefore, the vehicle occupant may perceive arbitrary switches in the state in which their eyes are directed to the vehicle front.

In the display control device for a vehicle with the structure described above, a display at the instrument cluster display may be set in accordance with operation of one of the plural steering switches. More specifically, a display item for the instrument cluster display is set by a short press operation of a steering switch, and a position adjustment function for the specified display item is implemented by a long press operation of the steering switch. In this structure, in association with implementation of the display item position adjustment function when the long press operation of the steering switch is detected, a third icon representing operation of the position adjustment function that is being implemented is displayed in the projection screen at a position corresponding with the steering switch and in the instrument cluster display at a position corresponding with the display item. Therefore, the vehicle occupant may intuitively perceive the display item in the instrument cluster display that corresponds with the position adjustment function being implemented in the state in which the line of sight of the vehicle occupant is directed to the vehicle front.

A second aspect of the present disclosure is a display method for a vehicle that includes: detecting an operation of a steering switch; on the basis of the detected operation, displaying plural icons corresponding to the steering switch at a display section in a cabin, the plural icons including a first icon representing a first function that is implemented by a short press operation of the steering switch, and a second icon representing a second function that is implemented by a long press operation of the steering switch; and when the short press operation of the steering switch is detected, displaying the first icon such that a disposition of the first icon in the display section corresponds with a disposition of the steering switch at a steering wheel, and displaying the second icon at a different position in the display section from the first icon.

A third aspect of the present disclosure is a non-transitory storage medium storing a program causing a computer to execute display processing for a vehicle, the display processing for a vehicle including: detecting an operation of a steering switch; on the basis of the detected operation, displaying plural icons corresponding to the steering switch at a display section in a cabin, the plural icons including a first icon representing a first function that is implemented by a short press operation of the steering switch, and a second icon representing a second function that is implemented by a long press operation of the steering switch; and when the short press operation of the steering switch is detected, displaying the first icon such that a disposition of the first icon in the display section corresponds with a disposition of the steering switch at a steering wheel, and displaying the second icon at a different position in the display section from the first icon.

As described above, a display control device for a vehicle, a display method for a vehicle and a non-transitory storage medium storing a display program for a vehicle according to the present disclosure provide an effect in that a function assigned to a short press operation of a steering switch and a function assigned to a long press operation may be comprehensibly delivered.

DETAILED DESCRIPTION

Figure 1:
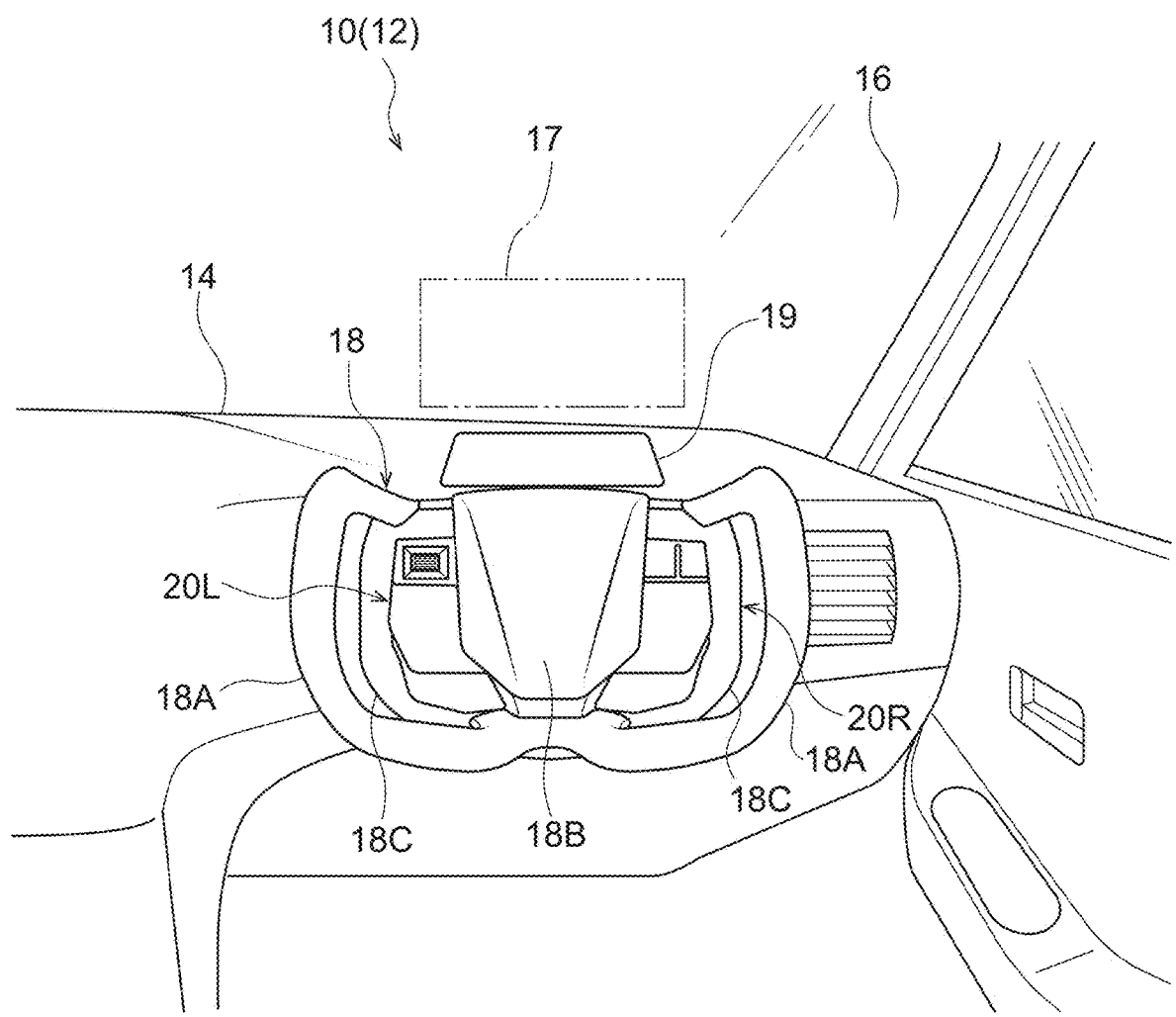
FIG. 1 is a view of a front portion of a cabin of a vehicle in which a vehicle display control device according to a present exemplary embodiment is employed, viewed from the vehicle rear side.

Below, a vehicle display control device 10 according to a present exemplary embodiment is described with reference to FIG. 1 to FIG. 10. As shown in FIG. 1, an instrument panel 14 is disposed in a front portion of a cabin of a vehicle 12 in which the vehicle display control device 10 according to the present exemplary embodiment is employed. A windshield glass 16 is disposed at a front end portion of the instrument panel 14. The windshield glass 16 extends in a vehicle vertical direction and a vehicle width direction, and divides the cabin interior from the cabin exterior.

A display screen 17 is disposed at the windshield glass 16. The display screen 17 is a projection screen at which images from a head-up display 15 (see FIG. 8) are projected onto a partial region of the windshield glass 16. The display screen 17 is disposed in a region of the windshield glass 16 to the vehicle front side of a driver seat with a steering wheel 18.

An instrument cluster display 19 is provided at a driver seat side (vehicle right side) of the instrument panel 14, at a position to the vehicle lower side of the display screen 17. The instrument cluster display 19 is capable of displaying information relating to traveling of the vehicle 12, such as a vehicle speed, engine speed, running distance and the like, and information relating to states of the vehicle 12, such as warning lights, operation states of lamps and the like. The instrument cluster display 19 is provided to the vehicle front side of the driver seat at the upper side of the steering wheel 18, which is described below.

Via a steering column that is not shown in the drawings, the steering wheel 18 is provided to the lower side of the instrument cluster display 19 of the instrument panel 14. The steering wheel 18 is equipped with a pair of rim portions 18A that are provided at left and right in the vehicle width direction. The pair of rim portions 18A are formed in circular arc shapes that protrude to the respective vehicle width direction outer sides, and are provided projecting to left and right from a central portion. An occupant of the driver seat grips the pair of rim portions 18A with their left and right hands and conducts steering of the steering wheel 18.

A hub portion 18B that constitutes a central portion is provided between the pair of rim portions 18A. The rim portions 18A and hub portion 18B are connected by a plural number (two in the present exemplary embodiment) of spoke portions 18C.

The spoke portions 18C are provided at two locations, between the rim portion 18A at the right side and the hub portion 18B, and between the rim portion 18A at the left side and the hub portion 18B. In this exemplary embodiment, right side switches 20R are provided at the spoke portion 18C between the rim portion 18A at the right side and the hub portion 18B. Meanwhile, left side switches 20L are provided at the spoke portion 18C between the rim portion 18A at the left side and the hub portion 18B. The right side switches 20R and left side switches 20L are described in more detail below.

The right side switches 20R and the left side switches 20L each structure a steering switch group including plural switches. In the present exemplary embodiment, in a case in which operations of the right side switches 20R and the left side switches 20L are detected by the vehicle display control device 10, plural icons representing each switch are displayed at a display section provided to the vehicle front of the driver seat.

For example, the above-described display screen 17 of the windshield glass 16 and instrument cluster display 19 of the instrument panel 14 may be employed as the display section. The display section according to the present exemplary embodiment is, for example, the display screen 17.

Hardware Structures

Figure 8:
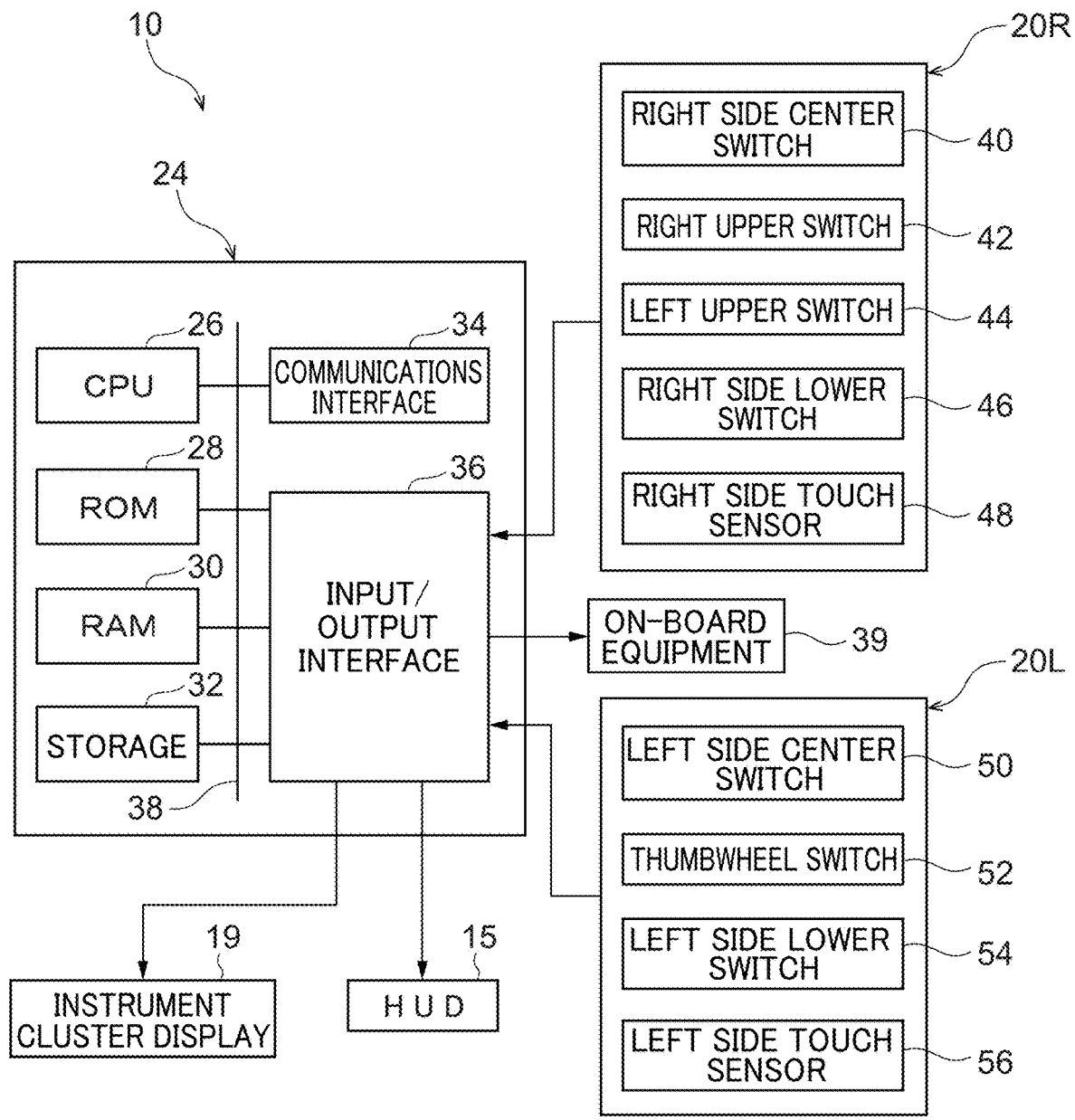
FIG. 8 is a block diagram showing hardware structures of the vehicle display control device according to the present exemplary embodiment.

FIG. 8 is a block diagram showing hardware structures of the vehicle display control device 10. As shown in FIG. 8, the vehicle display control device 10 includes a central processing unit (CPU) 26, read-only memory (ROM) 28, random access memory (RAM) 30, storage 32, a communications interface 34 and an input/output interface 36. These structures are connected to be capable of communicating with one another via a bus 38.

The CPU 26 is a central arithmetic processing unit that executes various programs and controls respective parts. That is, the CPU 26 reads a program from the ROM 28 or the storage 32, and executes the program using the RAM 30 as a workspace. The CPU 26 performs control of the structures described above and various kinds of computational processing in accordance with programs recorded in the ROM 28 or the storage 32.

The ROM 28 stores various programs and various kinds of data. The RAM 30 serves as a workspace, temporarily memorizing programs and data. The storage 32 includes a hard disk drive (HDD) or solid state drive (SSD). The storage 32 stores various programs, including an operating system, and various kinds of data.

The communications interface 34, which serves as a communications section, is an interface for an ECU 24 to communicate with a server and other equipment. The communications interface 34 employs a standard such as, for example, Ethernet®, FDDI, Wi-Fi® or the like.

The head-up display (HUD) 15, on-board equipment 39, the right side switches 20R and the left side switches 20L are connected to the input/output interface 36. More specifically, the input/output interface 36 is connected with the head-up display 15, which projects images onto the display screen 17. Thus, the input/output interface 36 receives signals from the CPU 26 and images are projected from the head-up display 15 at the display screen 17. The on-board equipment 39 is a general term encompassing, as well as equipment such as an air conditioner, audio equipment, a car navigation system and a voice entry device, driver assistance equipment such as Active Cruise Control (ACC) and Lane Tracing Assist (LTA).

Steering Switch Group

The right side switches 20R and left side switches 20L forming the steering switch group are disposed in operation regions provided at surfaces of the two spoke portions 18C. The right side switches 20R and left side switches 20L include plural touch switches formed of touch sensor-type switches, and a thumbwheel switch 52 formed of a non-touch-type switch.

Plural functions relating to inputs to the on-board equipment 39 are assigned to the respective touch switches. Each switch may implement plural functions, by what function is implemented changing between a case in which a short press operation is performed on an operation surface of the switch and a case in which a long press operation is performed.

The meaning of the term "short press operation" as used herein is intended to include an operation in which an operation surface of a switch is tapped and pressed for a short duration. Meanwhile, the meaning of the term "long press operation" as used herein is intended to include an operation in which the operation surface of the switch is pressed for at least a predetermined duration. In the present exemplary embodiment, an example is described in which functions are assigned to short press operations and long press operations of touch-sensor type switches, but types of the switches are not particularly limited. For example, switches may be push-type switches or a combination of these types.

Figure 2:
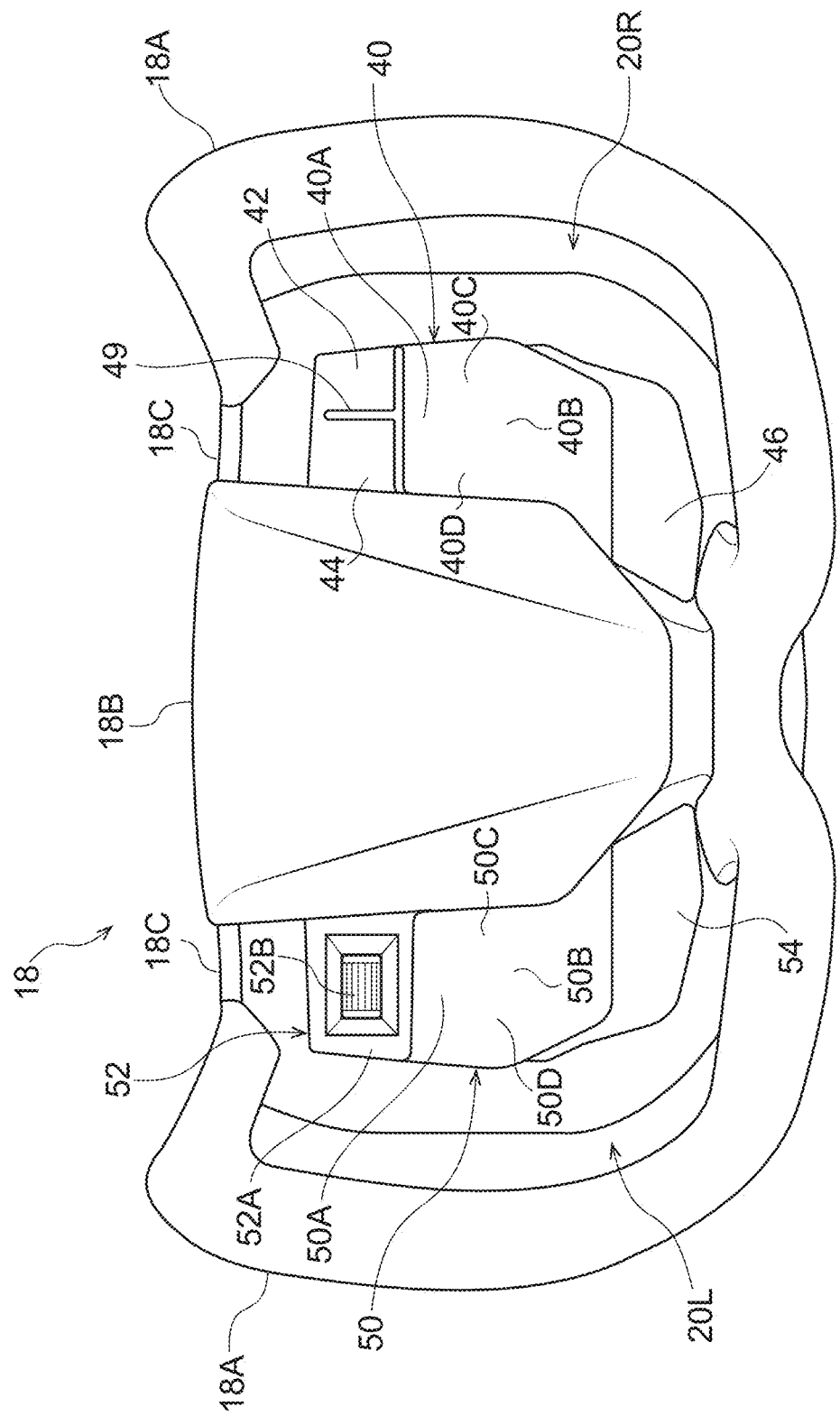
FIG. 2 is an elevation view of a steering wheel in FIG. 1.

As shown in FIG. 2, the right side switches 20R are structured with plural touch switches of the touch sensor type. More specifically, the right side switches 20R are provided with a centrally disposed right side center switch 40, a right upper switch 42 disposed at the right side of an upper portion, a left upper switch 44 disposed at the left side of the upper portion, and a right side lower switch 46 disposed at a lower portion.

The right side switches 20R are also provided with a right side touch sensor 48 that detects touch operations of the switches of the right side switches 20R. The right side touch sensor 48 is structured with, for example, electrostatic capacitance-type electrostatic sensors and is capable of detecting touches of an operating finger on surfaces of the right side switches 20R.

The right side center switch 40 has a substantially rectangular operation surface. Respective upper, lower, right and left regions of the right side center switch 40 form an upper switch 40A, a lower switch 40B, a right switch 40C and a left switch 40D. These sensor switches are employed when operating driver assistance equipment, principally focusing on instrument displays of the various kinds of on-board equipment.

The upper switch 40A, lower switch 40B, right switch 40C and left switch 40D are assigned different functions when images (icons or texts representing the respective switches) that are displayed at the instrument cluster display 19 are switched. In addition, the upper switch 40A, lower switch 40B, right switch 40C and left switch 40D may implement different functions when short press operations are performed and when long press operations are performed.

The right upper switch 42 is disposed to the upper right of the right side center switch 40 and has a substantially rectangular operation surface with a width around half the width of the operation surface of the right side center switch 40. A function that activates the ACC is assigned to the right upper switch 42.

The left upper switch 44 is disposed to the upper left of the right side center switch 40 and has a substantially rectangular operation surface with a width around half the width of the operation surface of the right side center switch 40. A function that activates the LTA is assigned to the left upper switch 44.

In the present exemplary embodiment, a differentiating protrusion 49 in an inverted "T" shape is provided at the surface of the spoke portion 18C, between the right side center switch 40, the right upper switch 42 and the left upper switch 44. A vehicle occupant may feel when a fingertip on the operation regions of the right side switches 20R passes over the differentiating protrusion 49. Therefore, the vehicle occupant may guide the operating finger to an arbitrary switch without looking at the operation surfaces of the steering switch.

The right side lower switch 46 is disposed at the lower side of the right side center switch 40 and has a substantially rectangular shape with a width similar to the width of the operation surface of the right side center switch 40. A function assigned to the right side lower switch 46 for when a short press operation is performed switches the images (icons or texts) corresponding to the right side switches 20R that are displayed at the instrument cluster display 19. That is, the right side lower switch 46 switches a page displayed at the instrument cluster display 19. A function assigned to the right side lower switch 46 for when a long press operation is performed is a function that may be implemented in accordance with a state of the vehicle 12 relating to traveling.

The left side switches 20L are provided with a centrally disposed left side center switch 50, a thumbwheel switch 52 disposed at an upper portion, and a left side lower switch 54 disposed at a lower portion.

The left side switches 20L are provided with a left side touch sensor 56 that detects touch operations of the touch sensor-type left side center switch 50 and left side lower switch 54. The left side touch sensor 56 is structured with, for example, electrostatic capacitance-type electrostatic sensors and is capable of detecting touches of an operating finger on surfaces of the left side center switch 50 and left side lower switch 54.

The left side center switch 50 has a substantially rectangular operation surface. Respective upper, lower, right and left regions of the left side center switch 50 serve as an upper switch 50A, a lower switch 50B, a right switch 50C and a left switch 50D.

The thumbwheel switch 52 is disposed to the upper side of the left side center switch 50 and is structured with a non-touch sensor-type switch. The thumbwheel switch 52 is a rotary-type switch that is structured with a widely known thumbwheel mechanism. The thumbwheel switch 52 is provided with a thumbwheel 52B that passes through an aperture in a switch bezel 52A provided at the spoke portion 18C. The thumbwheel 52B is provided to be operable by rotation. The thumbwheel switch 52 outputs signals in accordance with rotation directions and rotation amounts of the thumbwheel 52B. Thus, the thumbwheel switch 52 conducts input operations to on-board equipment assigned to that switch. In the present exemplary embodiment, a function that adjusts audio volume is assigned to the thumbwheel switch 52.

The left side lower switch 54 is disposed to the lower side of the left side center switch 50 and has a substantially rectangular operation surface with a similar width to the width of the operation surface of the left side center switch 50. A function that switches a page of images corresponding to the left side switches 20L displayed at the instrument cluster display 19 is assigned to the left side lower switch 54.

Functional Structures

The vehicle display control device 10 uses the hardware resources shown in FIG. 8 to realize various functions. Functional structures that are realized by the vehicle display control device 10 are described with reference to FIG. 9.

Figure 9:
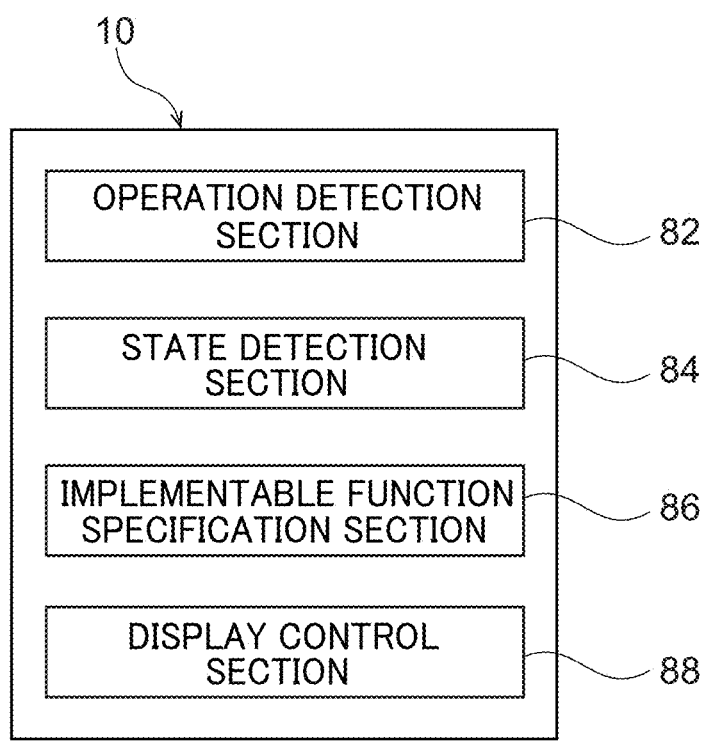
FIG. 9 is a block diagram showing functional structures of the vehicle display control device according to the present exemplary embodiment.

As shown in FIG. 9, as functional structures, the vehicle display control device 10 includes an operation detection section 82, a state detection section 84, an implementable function specification section 86 and a display control section 88. These functional structures are realized by the CPU 26 reading and executing a program stored in the ROM 28 or the storage 32.

The operation detection section 82 detects operations of the right side switches 20R and the left side switches 20L. More specifically, when one of the touch sensor-type switches of the right side switches 20R and left side switches 20L is operated by a touch, the operation detection section 82 detects an input to the on-board equipment 39 corresponding with the operated switch. In a case in which the thumbwheel switch 52 (non-touch type switch) of the left side switches 20L is operated, the operation detection section 82 detects an input to the on-board equipment 39 corresponding with the thumbwheel switch 52.

In the present exemplary embodiment, the functioning of the operation detection section 82 may distinctively detect whether an operation performed on a switch is a short press operation or a long press operation.

The state detection section 84 detects states of the vehicle 12 relating to traveling. For example, the state detection section 84 detects states of the vehicle 12 during traveling, while stopped, during driver assistance operations and the like. The meaning of the term "driver assistance" as used herein is intended to include functions that assist in traveling of the vehicle by automatically conducting some or all of operations of an accelerator, a brake, direction indicators, the steering wheel and so forth in, for example, Active Cruise Control (ACC), Lane Tracing Assist (LTA), Lane Change Assist (LCA), self-driving operation, remote driver assistance and so forth.

In a case in which an input to the on-board equipment 39 is detected by the functioning of the operation detection section 82, the implementable function specification section 86 determines whether or not an operation is possible and specifies a function that can be implemented. That is, because different functions are assigned to the right side center switch 40 and left side center switch 50 depending on the pages displayed at the display screen 17, the right side center switch 40 and left side center switch 50 can be switched to states in which operations are not possible in some pages. The implementable function specification section 86 determines whether or not operations of received inputs are possible for each of the right side center switch 40 and left side center switch 50.

In a case in which a function to be implemented by a short press operation and a function to be implemented by a long press operation are assigned to a single switch, the implementable function specification section 86 specifies the function that can be implemented by the long press operation in accordance with a state of the vehicle 12. More specifically, the implementable function specification section 86 specifies the function that can be implemented by the long press operation in accordance with a detected state of the vehicle 12 relating to traveling that is detected by the functioning of the state detection section 84.

In a case in which a touch operation on one of the switches forming the right side switches 20R and left side switches 20L is detected by the functioning of the operation detection section 82, the display control section 88 specifies an operation region associated with the touch-operated switch. The display control section 88 displays images (icons or texts) corresponding with the specified operation region and operation regions adjacent to the specified operation region at the display screen 17.

In a case in which a short press operation of one of the plural steering switches is detected, the display control section 88 displays, at the display screen 17, a first icon (a graphic, text or the like) representing the function assigned to the short press operation and a second icon representing the implementable function that is assigned to the long press operation of the same switch.

During implementation of a function assigned to a long press operation, the display control section 88 displays a third icon representing the operation being implemented at the display screen 17 and at the instrument cluster display 19.

Description of Display Information

Examples of display information displayed at the display screen 17 and instrument cluster display 19 by the functioning of the display control section 88 are described with reference to FIG. 3 to FIG. 7B.

Now, an example in which the right side switches 20R of the steering switch group are operated is described.

Figure 3:
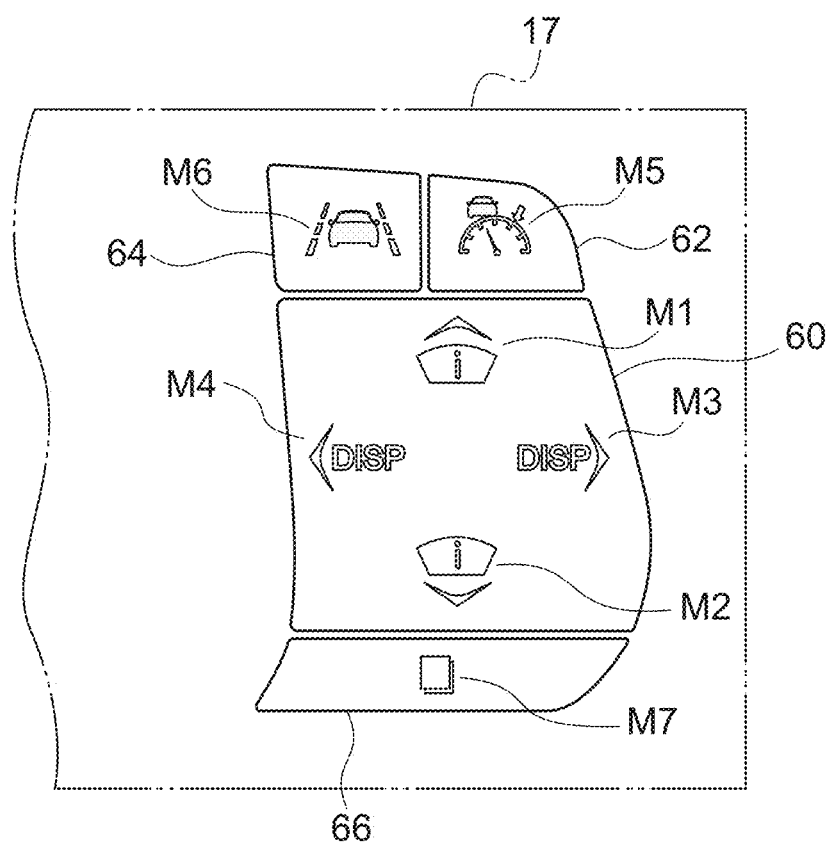
FIG. 3 is a view showing a display example of a display section according to the present exemplary embodiment, which is a display example of a number of icons corresponding to a right side switch.

After an operation (touch) on an operation region of the right side switches 20R is detected, plural icons corresponding to the plural switches included in the right side switches 20R are displayed at the display screen 17, as shown in FIG. 3. The icons are displayed such that the disposition of the plural icons in the display screen 17 corresponds with the disposition of the right side switches 20R at the steering wheel 18.

A right side center frame portion 60 is displayed at the right side of the display screen 17. The right side center frame portion 60 is a graphic icon depicting the operation surface of the right side center switch 40. Icons M1 to M4 are displayed in upper, lower, right and left regions of the right side center frame portion 60. The icons M1 to M4 correspond with the upper switch 40A, lower switch 40B, right switch 40C and left switch 40D of the right side center switch 40. The icons M1 to M4 correspond to specified functions of display items displayed at the instrument cluster display 19.

More specifically, the icons M1 and M2 are images depicting displays in which the letter "i" is displayed adjacent to images of arrows indicating the upper and lower directions. The icons M1 and M2 correspond to functions that set new display items to be displayed at the instrument cluster display 19, which are registered as preferences.

Icons M3 and M4 are icons displaying images that depict the string "DISP" adjacent to images of arrows indicating the left and right directions. The icons M3 and M4 correspond to functions for selecting one from among display items that have been registered as preferences beforehand by the above-mentioned display item registration functions corresponding to the icons M1 and M2.

The display items are at least one or a combination of, for example: various kinds of information relating to traveling of the vehicle 12 such as vehicle speed, engine speed, running distance, a remaining charge level and the like of an electric drive source, a remaining amount of fuel for driving, fuel efficiency and so forth; instrument information relating to states of the vehicle 12 such as warning lights, operation states of lamps and the like; and driver assistance information.

A right upper frame portion 62 is displayed to the upper right of the right side center frame portion 60. The right upper frame portion 62 is an icon depicting the operation surface of the right upper switch 42. An icon M5 with a shape depicting the vehicle and a meter is displayed superposed on the right upper frame portion 62. The icon M5 corresponds to an ACC function.

A left upper frame portion 64 is displayed to the upper left of the right side center frame portion 60. The left upper frame portion 64 is an icon depicting the operation surface of the left upper switch 44. An icon M6 depicting the vehicle and a traffic lane is displayed superposed on the left upper frame portion 64. The icon M6 corresponds to an LTA function.

A differentiating space 58 corresponding with the shape of the differentiating protrusion 49 is provided. Thus, the right side center frame portion 60, the right upper frame portion 62 and the left upper frame portion 64 are displayed in the form of islands.

A right side lower frame portion 66 is displayed under the right side center frame portion 60. The right side lower frame portion 66 is an icon depicting the operation surface of the right side lower switch 46. An icon M7 depicting a shape in which rectangles are overlaid is displayed superposed on the right side lower frame portion 66. The icon M7 corresponds to a function that changes the page of images (icons or texts) corresponding with the right side switches 20R. Thus, the on-board equipment that is assigned to the right side switches 20R changes in accordance with switching of the display.

As described above, in the present exemplary embodiment, a first function to be implemented by a short press operation and a second function to be implemented by a long press operation may be assigned to one switch, and icons representing these functions may be displayed at the display screen 17. Below, examples of displays of functions assigned to the right side center switch 40 and the right side lower switch 46 are described with reference to FIG. 4A to FIG. 7B.

Display Examples of the Right Side Center Switch 40

Display item setting functions are assigned to the upper switch 40A, lower switch 40B, right switch 40C and left switch 40D of the right side center switch 40 as the first functions to be implemented by short press operations. Position adjustment functions for a display item set by the short press operations are assigned to the upper switch 40A, lower switch 40B, right switch 40C and left switch 40D as the second functions to be implemented by long press operations.

By the functioning of the operation detection section 82 and the display control section 88 of the vehicle display control device 10, when a short press operation of the right side center switch 40 is detected, the icons M1 to M4 representing the display item setting functions (the first functions) are displayed at the display screen 17. More specifically, the icons M1 to M4 are displayed superposed on the right side center frame portion 60 (a graphic icon) with disposition relationships that correspond with the upper switch 40A, lower switch 40B, right switch 40C and left switch 40D.

Figure 4A:
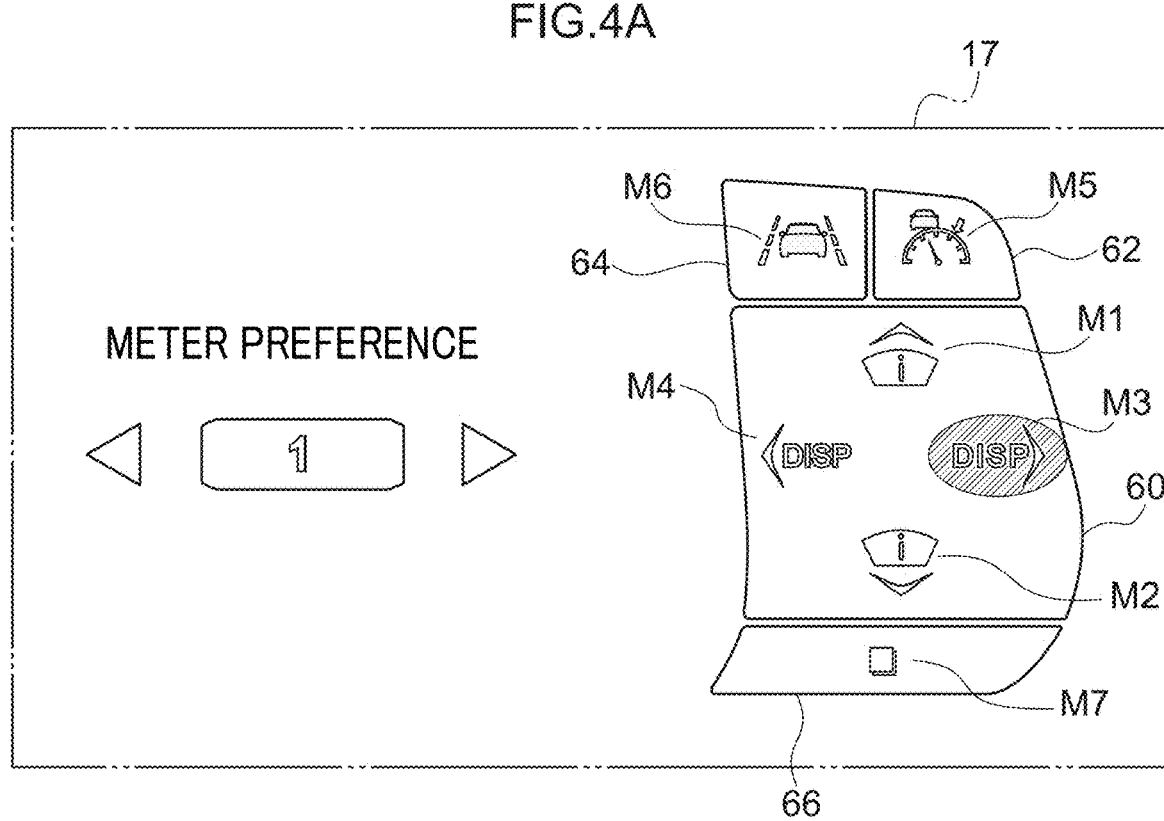
FIG. 4A is a display example in a case in which a short press operation of a right side center switch is detected during traveling of the vehicle.
Figure 4B:
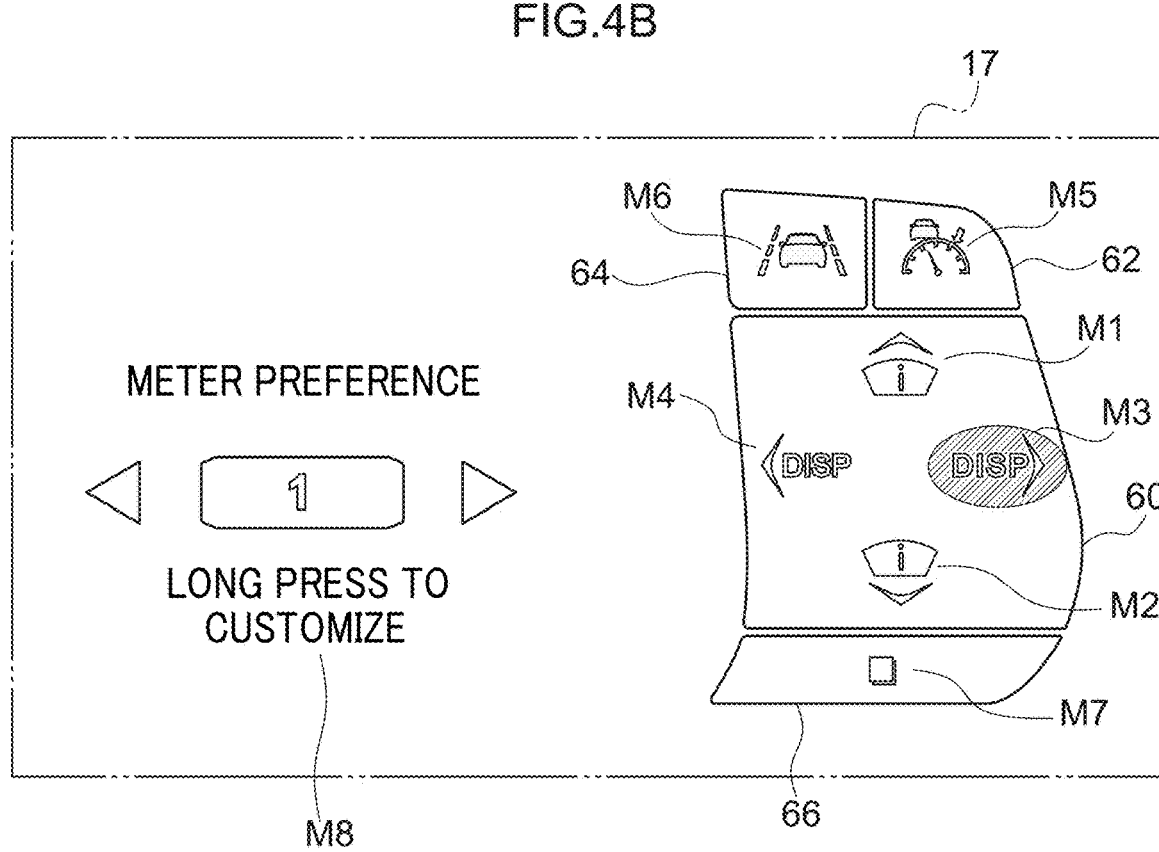
FIG. 4B shows a display example in a case in which the short press operation of the right side switch is detected while the vehicle is stopped.

As shown in FIG. 4B, by the functioning of the implementable function specification section 86 and the display control section 88, when a short press operation is detected, an icon M8 representing a position adjustment function (a second function) of the display item, which corresponds to the long press operation, is displayed together with the icons M1 to M4 representing the display item setting functions (the first functions).

The icon M8 representing the second function is an icon of an image depicting a text example such as "Long press to customize". The icon M8 is displayed at a position that is not superposed with the right side center frame portion 60, and thus is displayed at a different position from the icons M1 to M4 representing the first functions.

However, the icon M8 representing the second function is displayed only when the second function can be implemented according to the state of the vehicle 12 relating to traveling.

The display item position adjustment functions that are assigned as second functions of the upper switch 40A, lower switch 40B, right switch 40C and left switch 40D are functions that can be implemented only when the vehicle 12 is in a stopped state. Therefore, in a case in which the functioning of the state detection section 84 detects that the vehicle 12 is in a traveling state, the second functions of the upper switch 40A, lower switch 40B, right switch 40C and left switch 40D are not specified by the functioning of the implementable function specification section 86 as functions that can be implemented. Accordingly, as shown in FIG. 4A, the icon M8 is not displayed at the display screen 17 while the vehicle 12 is traveling.

On the other hand, in a case in which the functioning of the state detection section 84 detects that the vehicle 12 is in a stopped state, the second functions of the upper switch 40A, lower switch 40B, right switch 40C and left switch 40D are specified by the functioning of the implementable function specification section 86 as functions that can be implemented. Accordingly, as shown in FIG. 4B, the icon M8 is displayed at the display screen while the vehicle is stopped. Hence, by seeing the display screen 17, a vehicle occupant may perceive that the display item position adjustment functions can be implemented by long press operations.

Figure 5A:
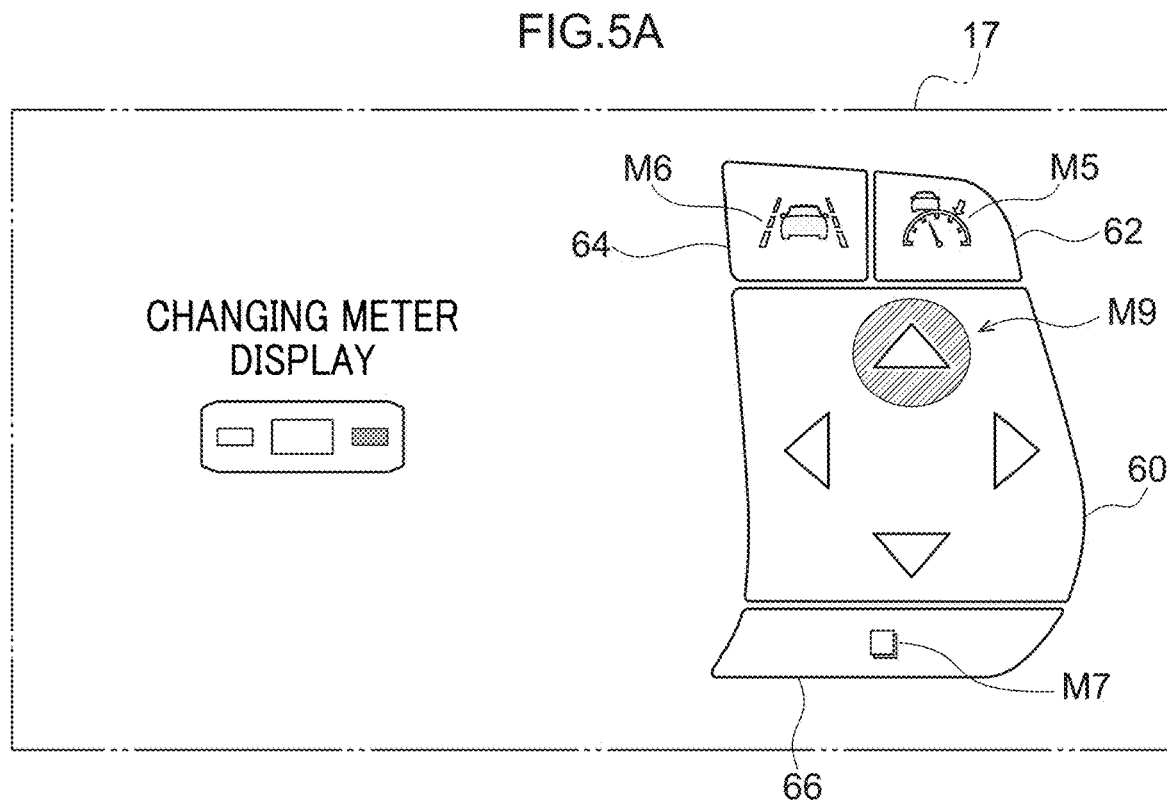
FIG. 5A shows an example of a display screen of a head-up display, which is a display example showing a state in which a second function is implemented by a long press operation of one of plural switches included at the right side center switch while the vehicle is stopped.
Figure 5B:
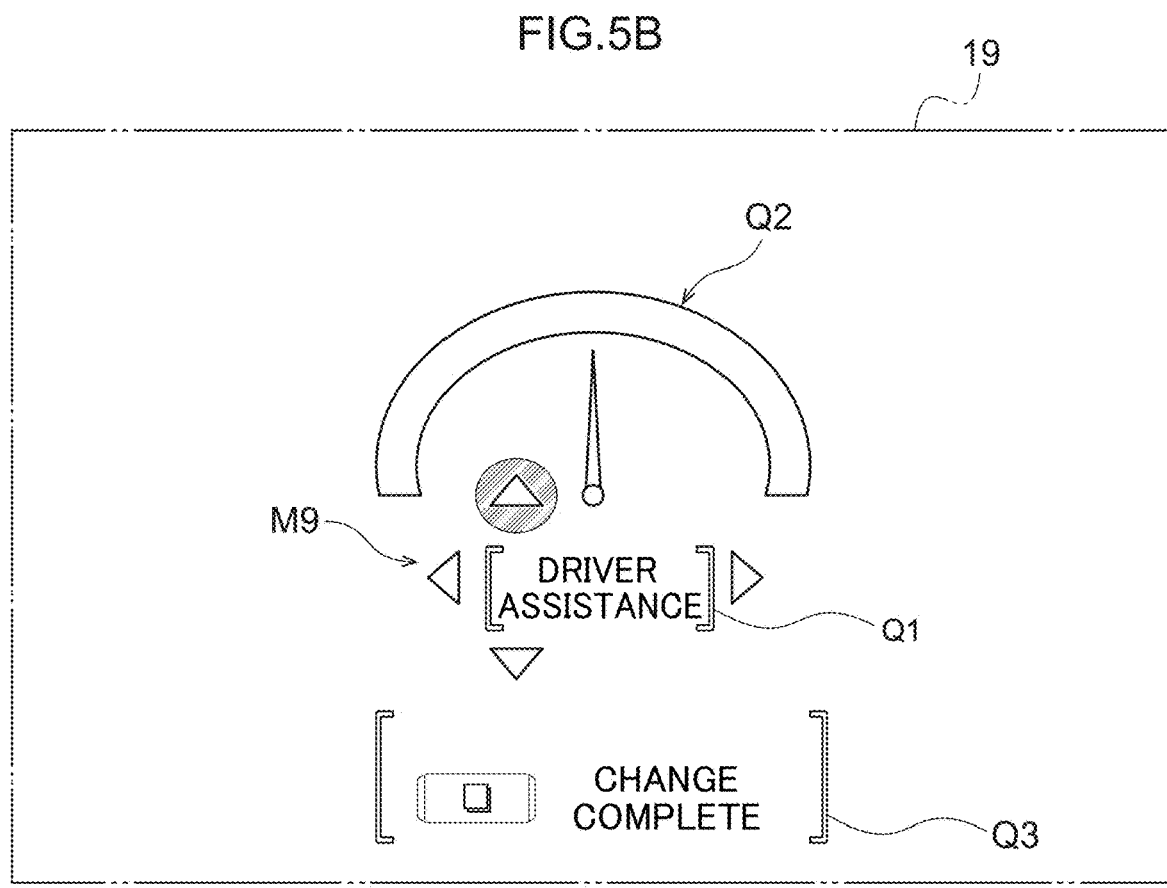
FIG. 5B shows an example of a display image of an instrument cluster display, which is a display example showing a state in which the second function is implemented by the long press operation of the one of the plural switches included at the right side center switch while the vehicle is stopped.
Figure 6:
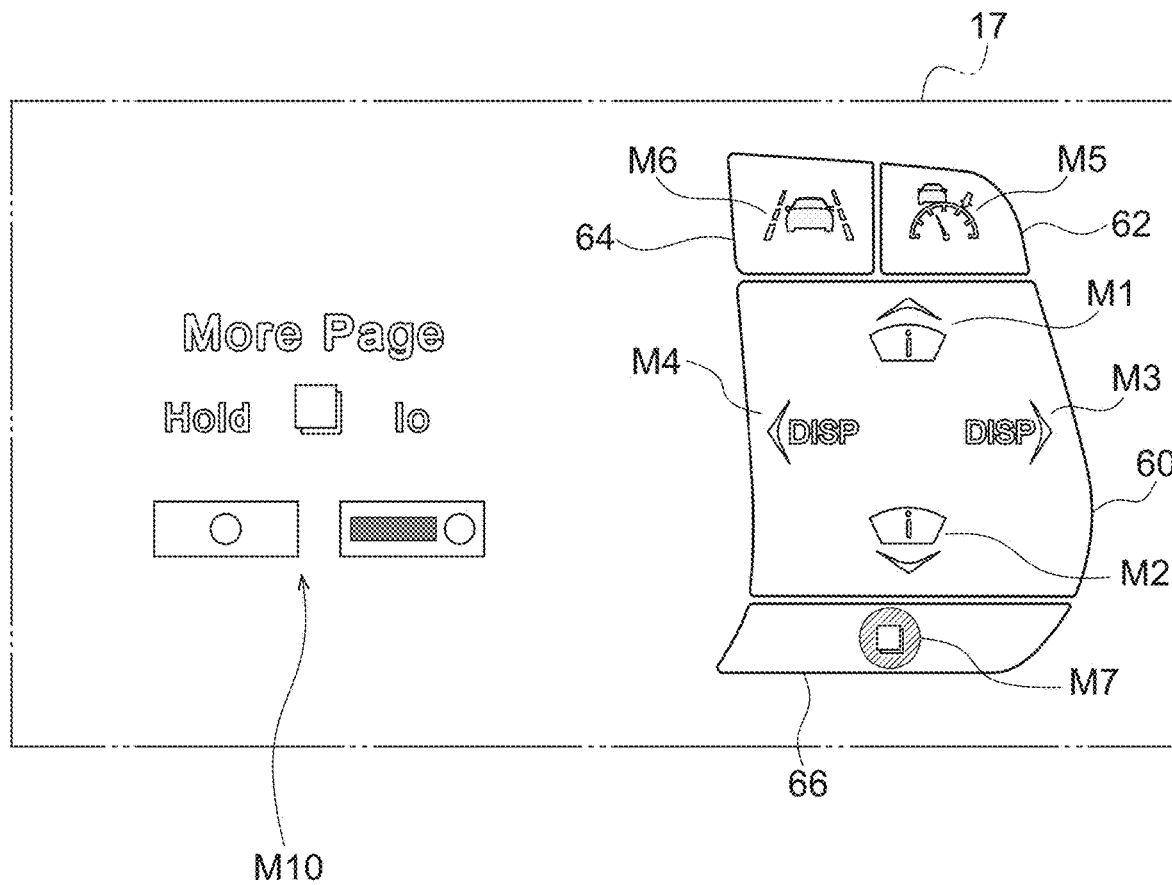
FIG. 6 shows a display example in a case in which a short press operation of one of the plural switches included at the right side center switch is detected while the vehicle is stopped.

As shown in FIG. 5A and FIG. 5B, during implementation of the second functions at the right side center switch 40, icons M9 (a third icon) representing an operation that is being implemented are displayed at the display screen 17 and the instrument cluster display 19.

The icons M9 are icons of images representing upper, lower, right and left arrows. The icons M9 represent operations of the upper switch 40A, lower switch 40B, right switch 40C and left switch 40D of the right side center switch 40. The icons M9 display an image of an arrow that corresponds with the switch being operated more prominently than the other arrows.

In the display screen 17, the icons M9 are displayed superposed on the right side center frame portion 60 and have disposition relationships that correspond with the upper switch 40A, lower switch 40B, right switch 40C and left switch 40D.

In the instrument cluster display 19, the icon M9 is displayed at a position corresponding with a display item Q1, which is the object of the operation being implemented. Therefore, by seeing the display screen 17 and the instrument cluster display 19, a vehicle occupant may intuitively perceive that position adjustment is being applied to the display item Q1 by the switch that is being operated. In the example shown in FIG. 5B, a "Driver assistance" item that is the display item Q1, which is displayed at the lower side of a meter Q2, is selected. Thus, it can be seen that setting operations of a display position of the display item Q1 relating to driver assistance are being implemented.

An icon Q3 that represents an operational procedure for ending changes of the display position is displayed in the display screen of the instrument cluster display 19, at the lower side of the display item Q1. In the icon Q3, a text string saying "Change complete" is displayed adjacent to an icon corresponding to the right side lower switch 46 (icon M7 in FIG. 3). Thus, it can be seen that a display item setting mode may be ended by an input at the right side lower switch 46.

Display Examples of the Right Side Lower Switch 46

As another example, display examples of a first function and second function that are assigned to the right side lower switch 46 are described.

A function that changes the display page of the right side center switch 40 is assigned to the right side lower switch 46 as the first function that is to be implemented by a short press operation.

Two functions are assigned to the right side lower switch 46 as second functions to be implemented by a long press operation: a meter position changing function for changing the display position of the meter Q2 in the instrument cluster display 19 (see FIG. 5B); and a report display setting function relating to reports of driver assistance that is being conducted.

The meter position changing function for changing the display position of the meter Q2 in the instrument cluster display 19 may be implemented only when a traveling state of the vehicle 12 is a stopped state. Accordingly, as shown in FIG. 5A, after a short press operation of the right side lower switch 46 is performed while the vehicle 12 is stopped, the icon M7 representing the function for changing the display page of the right side center switch 40 (the first function) is displayed together with an icon M10 representing the meter position changing function (the second function) corresponding to the long press operation. The icon M10 is, for example, an icon of an image in which a position of the meter Q2 in the instrument cluster display 19 is moved from the middle toward the right side of the screen.

Figure 7A:
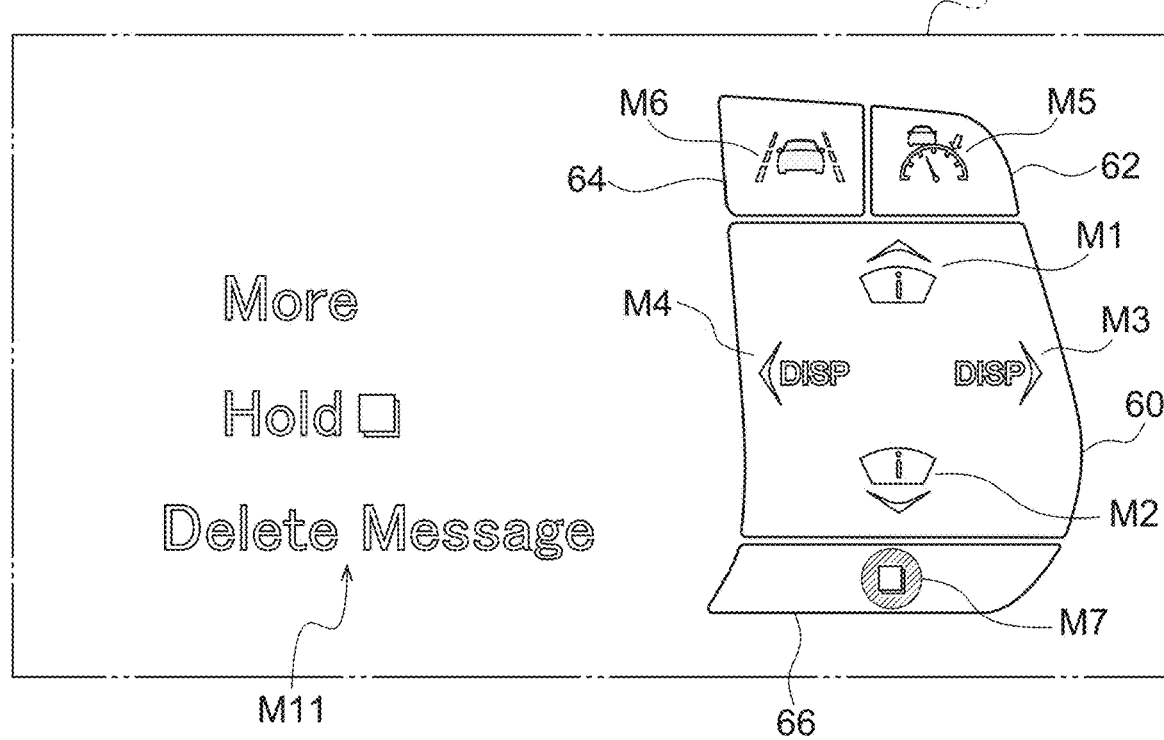
FIG. 7A shows an example of a display screen of the head-up display, which is a display example during conduct of driver assistance of the vehicle.
Figure 7B:
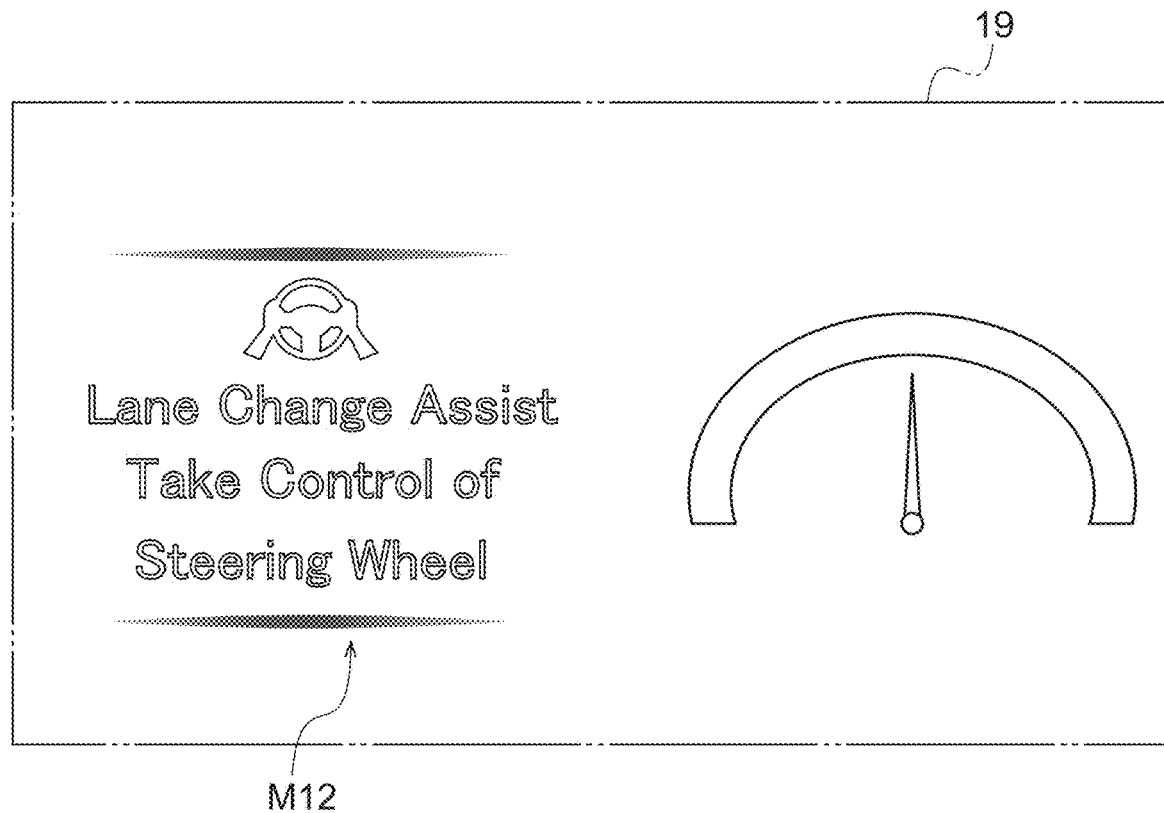
FIG. 7B shows an example of a display screen of the instrument cluster display, which is a display example during the conduct of driver assistance of the vehicle.

On the other hand, the report display setting function relating to reports of driver assistance that is being implemented can be implemented only when driver assistance is being conducted in the vehicle 12. Accordingly, as shown in FIG. 7A, after a short press operation of the right side lower switch 46 is performed while driver assistance is being conducted in the vehicle 12, the icon M7 representing the function for changing the display page of the right side center switch 40 (the first function) is displayed together with an icon M11 representing the report display setting function (the second function) corresponding to the long press operation. This report display setting function may set display or non-display of a message icon M12 that is displayed at the instrument cluster display 19, as shown in FIG. 7B, to report to a vehicle occupant the driver assistance that is being conducted. The icon M11 representing this report display setting function (the second function) is, for example, an icon depicting a text string such as "Delete message" or "Add message".

Example of Display Processing

Now, an example of a flow of display processing by the vehicle display control device 10 in relation to the right side switches 20R described above is described with reference to the flowchart in FIG. 10. This display processing is executed, for example, when ignition (power) of the vehicle 12 is turned on, and is performed by the CPU 26 reading a program from the ROM 28 or storage 32, loading the program into the RAM 30 and executing the program.

Figure 10:
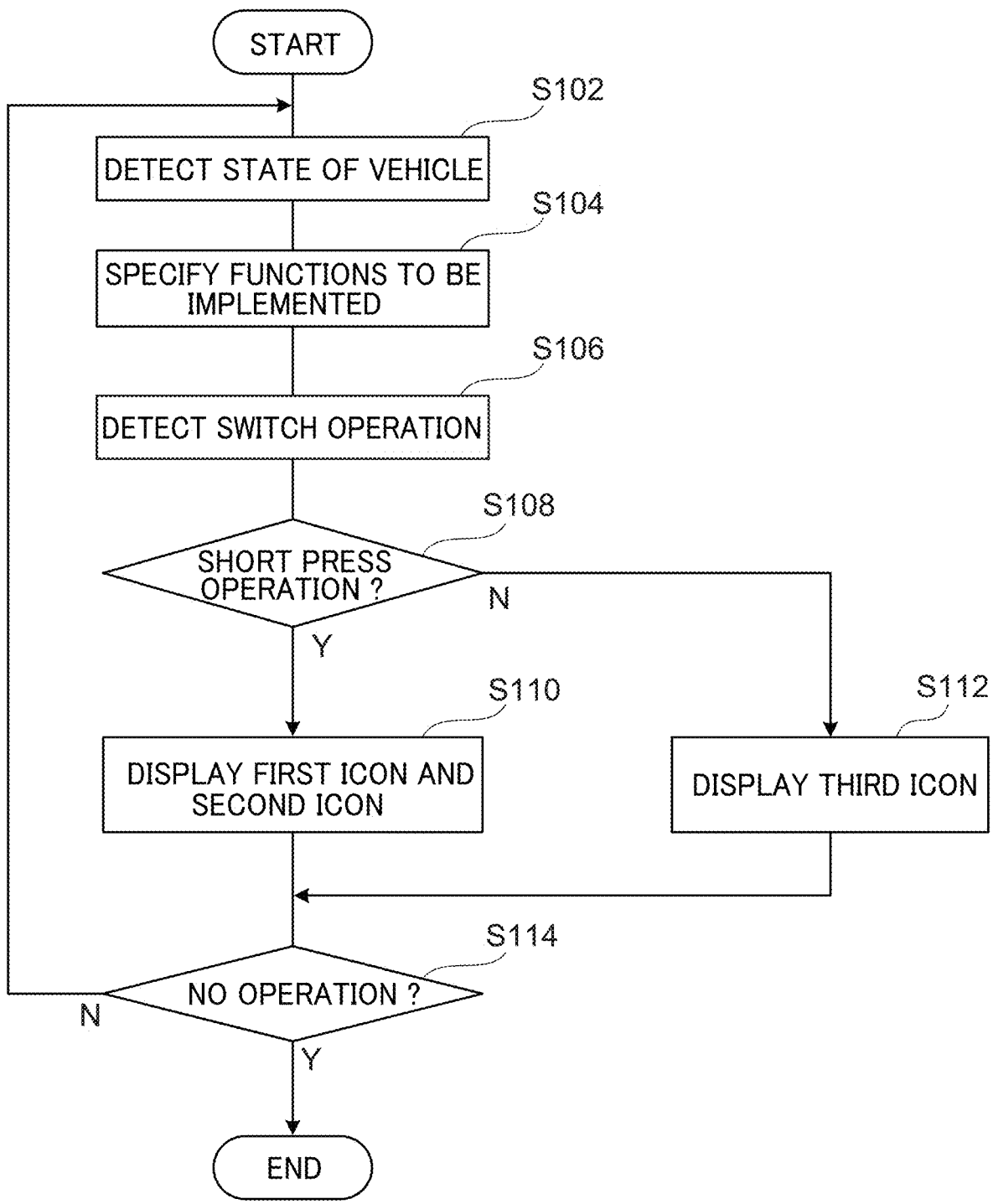
FIG. 10 is a flowchart showing an example of a flow of display processing by the vehicle display control device according to the present exemplary embodiment.

As shown in FIG. 10, in step S102, by the functioning of the state detection section 84, the CPU 26 detects a state of the vehicle.

In step S104, in accordance with the state of the vehicle 12 detected by the state detection section 84, the CPU 26 specifies functions that can be implemented by operations of the steering switches.

In step S106, by the functioning of the operation detection section 82, the CPU 26 detects an operation performed on one of the plural steering switches.

In step S108, the CPU 26 makes a determination as to whether the operation detected by the functioning of the operation detection section 82 is a short press operation. In a case in which the CPU 26 determines that the operation is a short press operation, the CPU 26 proceeds to the processing of step S110. Alternatively, in a case in which the CPU 26 determines that the operation is not a short press operation, the CPU 26 determines that the operation is a long press operation and proceeds to the processing of step S112.

In step S110, for the steering switch whose operation is detected, the CPU 26 displays the first icon representing the first function implemented by the short press operation (icon M3 in FIG. 4B) and the second icon representing the second function that can be implemented by the long press operation (icon M8 in FIG. 4B) at the display section.

This second icon is displayed only in a case in which a second function is able to be implemented according to the state of the vehicle 12 relating to traveling. In a case in which no second function can be implemented due to the state of the vehicle 12, the second icon is not displayed.

Alternatively, in a case in which the CPU 26 determines that the operation of the switch is a long press operation in step S108 and proceeds to step S112, the CPU 26 displays the third icon (icon M9 in FIG. 5A and FIG. 5B) representing the operation that is being implemented by the second function assigned to the long press operation.

As shown in FIG. 5A and FIG. 5B, this third icon is displayed at positions corresponding with the function being implemented in the display screen 17 of the head-up display 15 and in the instrument cluster display 19.

In step S114, the CPU 26 makes a determination as to whether operations of the steering switches are no longer being detected. In a case in which the CPU 26 determines that switch operations are no longer being detected, the CPU 26 ends the display processing. Alternatively, in a case in which the CPU 26 determines that switch operations are being detected, the CPU 26 returns to step S102.

Operation

As described above, in the vehicle display control device 10 according to the present exemplary embodiment, plural icons corresponding with the steering switch group are displayed at a display section provided to the front side of the steering wheel 18. As a result, a vehicle occupant may operate arbitrary switches in a state in which their eyes are directed at the display screen 17 of the head-up display 15.

The first icon representing the first function that is implemented by the short press operation of a steering switch and the second icon representing the second function that is implemented by the long press operation of the steering switch are displayed in this display screen 17.

As an example, FIG. 4B shows a state in which, in a case in which a short press operation of the right switch 40C of the right side center switch 40 is detected, the icon M3 (the first icon) representing the display item setting function that is implemented by the short press operation and the icon M8 representing the display item position adjustment function that can be implemented by a long press operation are displayed at the display screen 17.

In the vehicle display control device 10, in a case in which a short press operation of a steering switch is performed, the first icon representing the first function being implemented (the icon M3 in FIG. 4A) is displayed superposed on a graphic icon that depicts the outline of the steering switch (the right side center frame portion 60 in FIG. 4A). Meanwhile, the second icon representing the second function that is not being implemented (icon M8 in FIG. 4B) is displayed at a position that is not superposed with the graphic icon. Therefore, the design of the steering switch and the graphic icon displayed at the display screen 17 are associated and, for the function being implemented by the short press operation, a visual effect similar to when the steering switch is viewed directly may be provided even while the display screen 17 is being viewed. For the function corresponding to the long press operation that is not being implemented, because the corresponding second icon is displayed at a position that is not superposed with the graphic icon, the fact that this function is not currently being performed may be visually recognized easily.

In the present exemplary embodiment, after a state of the vehicle relating to traveling is detected, second functions that can be implemented by long press operations of the steering switches are specified on the basis of the detected state of the vehicle. Hence, in a case in which a short press operation of one of the plural steering switches is detected, the second icon representing the second function that can be implemented is displayed separately from the first icon representing the first function that is being implemented. Therefore, for a second function assigned to a long press operation, only a function that can be implemented in accordance with the state of the vehicle relating to traveling is displayed at the display section. Thus, an amount of information on the display screen may be optimized and the second function may be comprehensibly presented.

For example, the display item position adjustment function (the second function) assigned to the long press operation of the right switch 40C is a function that can be implemented only while the vehicle is stopped. Therefore, in a case in which a state of the vehicle during traveling is detected, the icon M8 representing the second function is not displayed, as shown in FIG. 4A. On the other hand, in a case in which a state of the vehicle while stopped is detected, the icon M8 is displayed in the display screen 17, as shown in FIG. 4B.

In the present exemplary embodiment, as an example, display item setting functions in the instrument cluster display 19 are assigned to the short press operations of the upper switch 40A, lower switch 40B, right switch 40C and left switch 40D forming the right side center switch 40, and display item position adjustment functions are assigned to the long press operations. In the present exemplary embodiment, when the position adjustment functions are implemented by long press operations of the right side center switch 40, the icons M9 (the third icon) representing the operations being implemented are displayed in the display screen 17 and in the instrument cluster display 19.

The icons M9 are displayed in the display screen 17 at a position corresponding with the switch being operated and displayed in the instrument cluster display 19 at a position corresponding with the display item in the display screen. Therefore, in a state in which the eyes of a vehicle occupant are directed to the vehicle front, the vehicle occupant may intuitively perceive the display item in the instrument cluster display that corresponds with the position adjustment function being implemented.

Supplementary Descriptions

An exemplary embodiment is described above but it will be clear that numerous modes are possible within a scope not departing from the gist of the present invention. For example, the exemplary embodiment described above describes an example in which the first icon and second icon are displayed at the display screen 17 of the head-up display 15, but the same may be displayed at the instrument cluster display 19. The first to third icons and the graphic icon may be displayed at a single display section.

The processing that, in the exemplary embodiment described above, is executed by the CPU 26 reading a program may be executed by various kinds of processor other than the CPU 26. Examples of processors in these cases include a PLD (programmable logic device) in which a circuit configuration can be modified after fabrication, such as an FPGA (field programmable gate array) or the like, a dedicated electronic circuit which is a processor with a circuit configuration that is specially designed to execute specific processing, such as an ASIC (application-specific integrated circuit) or the like, and so forth. The above processing may be executed by one of these various kinds of processors, and may be executed by a combination of two or more processors of the same or different kinds, for example, plural FPGAs, a combination of a CPU with an FPGA, or the like. Hardware structures of these various kinds of processors are, to be more specific, electronic circuits combining circuit components such as semiconductor components and the like.

The exemplary embodiment described above has a configuration in which various kinds of data are memorized at the storage 32, but this is not limiting. For example, a non-transitory recording medium, such as a CD-ROM (compact disc read-only memory), DVD-ROM (digital versatile disc read-only memory), USB (universal serial bus) memory or the like, may be used as a memory unit. In this case, various programs, data and the like are stored at this recording medium.

What is claimed is:

1. A display control device for a vehicle, the display control device comprising:
a memory; and
a processor that is connected to the memory and is configured to:
detect an operation of one of a plurality of steering switches;
on the basis of the detected operation, display a plurality of icons corresponding to the plurality of steering switches at a display section in a cabin; and in a case in which the detected operation is a long press operation of the one of the plurality of steering switches, further display one or more first icons representing operation of a function implemented by the long press operation, wherein the plurality of icons comprises graphic icons that depict outlines of the plurality of steering switches, and the processor is configured to display the one or more first icons superposed on the graphic icons.

2. The display control device according to claim 1, wherein the processor is configured to prominently display a first icon corresponding to a steering switch that is being operated by a user, among the one or more first icons.

3. The display control device according to claim 1, wherein the function implemented by the long press operation comprises a customize function of a display item in an instrument cluster display.

4. The display control device according to claim 3, wherein the customize function comprises a position adjustment function of the display item in the instrument cluster display.

5. The display control device according to claim 3, wherein the processor is configured to further display the one or more first icons at positions corresponding to the display item in the instrument cluster.

6. The display control device according to claim 3, wherein the display item in the instrument cluster display is set by a short press operation of the plurality of steering switches.

7. The display control device according to claim 3, wherein the processor is configured to further display a second icon indicating operational procedure for the function implemented by the long press operation.

8. The display control device according to claim 1, wherein the function implemented by the long press operation comprises a report display setting function relating to reports of driver assistance that is being conducted.

9. The display control device according to claim 1, wherein the processor is configured to:
　detect a state of the vehicle relating to traveling; and
　on the basis of the detected state of the vehicle, enable the function implemented by the long press operation of the one of the plurality of steering switches.

10. The display control device according to claim 9, wherein the detected state of the vehicle comprises a stopped state of the vehicle, or a state in which driver assistance is being conducted in the vehicle.

11. The display control device according to claim 1, wherein the display section comprises a projection surface of a head-up display provided to the vehicle front side of the steering wheel.

12. A display method for a vehicle, the method comprising:
　detecting an operation of one of a plurality of steering switches;
　on the basis of the detected operation, displaying a plurality of icons corresponding to the plurality of steering switches at a display section in a cabin; and
　in a case in which the detected operation is a long press operation of the one of the plurality of steering switches, further displaying one or more first icons representing operation of a function implemented by the long press operation, wherein
　the plurality of icons comprises graphic icons that depict outlines of the plurality of steering switches, and
　the one or more first icons are displayed superposed on the graphic icons.

13. A non-transitory storage medium storing a computer-readable program causing a computer to execute display processing for a vehicle, the display processing comprising:
　detecting an operation of one of a plurality of steering switches;
　on the basis of the detected operation, displaying a plurality of icons corresponding to the plurality of steering switches at a display section in a cabin; and
　in a case in which the detected operation is a long press operation of the one of the plurality of steering switches, further displaying one or more first icons representing operation of a function implemented by the long press operation, wherein
　the plurality of icons comprises graphic icons that depict outlines of the plurality of steering switches, and
　the one or more first icons are displayed superposed on the graphic icons.

14. A display method for a vehicle, the method comprising:
　detecting an operation of one of a plurality of steering switches;
　on the basis of the detected operation, displaying a plurality of icons corresponding to the plurality of steering switches at a display section in a cabin; and
　in a case in which the detected operation is a long press operation of the one of the plurality of steering switches, further displaying one or more first icons representing operation of a function implemented by the long press operation, wherein
　the function implemented by the long press operation comprises a customize function of a display item in an instrument cluster display.

\* \* \* \* \*